Patented June 30, 1942

2,288,588

UNITED STATES PATENT OFFICE 2,288,588

SOLVENT FOR ORGANIC FILM-FORMING MATERIALS

Alfred Rieche, Wolfen, Kreis Bitterfeld, and Alfred Gnuechtel, Wiederitzsch, near Leipzig, Germany, assignors, by mesne assignments, to General Aniline & Film Corporation, New York, N. Y., a corporation of Delaware No Drawing. Application March 8, 1939, Serial No. 260,548. In Germany May 7, 1938

3 Claims. (Cl. 260—32)

This invention relates to solvents for organic film-forming materials, especially those applicable to the manufacture of plastic masses, lacquers, priming compositions, emulsions, covering colors, adhesives, foils, films, bands, varnish and lacquer removers or artificial threads.

We have found that 3-halogen-tetrahydrofuranes, in particular 3-chlor- or 3-brom-tetrahydrofurane, have an excellent solvent power for organic film-forming substances which are used as basic substances for lacquers and other plastic masses, such as cellulose esters and ethers, polymerized vinyl compounds and the like and that these 3-halogen-tetrahydrofuranes are also solvents for gums and resins used in lacquers. They are also compatible with other ingredients in commercial use in the preparation of lacquers, as for example with softening agents, plasticizers and the like.

The 3-halogentetrahydrofuranes used as solvents according to our invention have the following formula:

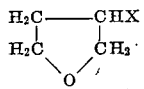

in which X stands for chlorine or bromine. They may be easily prepared by splitting off hydrogen halide from 3.4-dichlor or 3.4-dibrom butanol. See in this connection the article by M. H. Pariselle, Comptes Rendus de L'Académie des Sciences, vol. 148 (1909), pages 849 to 851.

The 3-halogen-tetrahydrofuranes are immiscible with water, miscible with many organic solvents, as for example with aliphatic and aromatic hydrocarbons, chlorinated hydrocarbons, alcohols, glycols, glycolethers and esters, acetic acid esters of low molecular aliphatic alcohols and ketones, and, therefore, are very desirable solvents in the preparation of compositions of matter and plastic compositions containing polymerized vinyl compounds and other plastic materials.

They are suitable for example for dissolving natural and synthetic resins, as for example, manila copal, colophony or phenol-aldehyde resins, etherified urea resins, such as are obtained for example by condensation of urea with formaldehyde or of dimethylol urea in alcohols, condensation products of rosin acids or their esters with maleic acid, cumarone resins, and alkyd resins of various kinds. They also dissolve cellulose derivatives, i. e. cellulose esters, as for example nitrocellulose and organic cellulose esters, cellulose ethers, as for example ethyl or benzyl cellulose, cellulose ether esters, and also rubber and rubber-like substances, as for example polymerized isoprene or butadiene, their chlorination products and also rubber isomerisation products.

3-halogen-tetrahydrofuranes may also especially be used for dissolving synthetic vinyl polymerization products, such as polyvinyl chloride, polyvinyl esters of organic acids, as for example polyvinyl acetate, polyvinyl ethers, polyvinyl carbazole, and also polyacrylic acid and polymethacrylic acid and their derivatives and interpolymerization products of different vinyl compounds. 3-halogen-tetrahydrofuranes also have a good solvent power for the waxes and drying oils used in the preparation of lacquers, as for example linseed oil, wood oil, oiticica oil or root oil, and also for the fundamental substances used in the preparation of asphalt lacquers.

The solutions thus prepared may have added to them the usual softening agents and also to a large extent adulterants. Many of the dyestuffs used for coloring lacquers also have a good solubility in tetrahydrofuranes. Insoluble organic or inorganic fillers may, however, also be added to the lacquers.

The use of 3-chlor-tetrahydrofurane as a solvent is very advantageous. It is stable, low-viscous and colorless, thereby being suitable for the production of clear or light colored lacquers and plastic compositions. Its boiling point starts at 121° C.; the speed of evaporation amounts to from 17 to 18 calculated on the speed of evaporation 1 of diethyl ether. It will be obvious from the foregoing explanations that it is possible according to our present invention to vary the properties of the compositions within very wide limits and to fulfill all requirements of practice, for example the hardness, the time required for drying and the like. The possibility of using 3-chlor-tetrahydrofurane as a solvent for vinyl polymerization products, such as polyvinyl chloride (also polyvinyl chloride containing more chlorine than corresponds to the formula $CH_2=CHCl$), polyvinyl carbazole and interpolymerization products of vinyl chloride and acrylic acid esters, for which no satisfactory solvents have hitherto been available, should be specially emphasized.

The following examples will further illustrate how this invention may be carried out in practice, but the invention is not restricted to these examples. The parts are by weight.

*Example 1*

20 parts of a polyvinyl chloride (K-value=28)

which is not soluble without difficulty in esters or benzene hydrocarbons are dissolved, while heating to 60° C., in 80 parts of 3-chlor-tetrahydrofurane. 12 parts of phthalic acid di-n-butylester and 4 parts of a water-soluble addition product of ethylene oxide to octadecyl-alcohol are added to the solution and the whole is then poured into 100 parts of water while stirring. There is obtained an emulsion which may be further diluted with water and allowed to be stored for a long time. It may be used for impregnating porous material such as textile material or paper.

Example 2

24 parts of chlororubber are dissolved in a mixture of 25 parts of 3-chlor-tetrahydrofurane and 10 parts of butyl-acetate. The highly viscous solution thus obtained may be diluted with from 18 to 20 parts of test benzine (boiling range 150° to 180° C.). There is obtained a lacquer to which softening agents and pigments may be added. The lacquer yields very level and resistant coatings after evaporation of the solvents.

Example 3

10 parts of polyvinyl methyl ether are dissolved in a mixture consisting of 50 parts of 3-chlor-tetrahydrofurane, 10 parts of alcohol, 2.5 parts of methanol, 2.5 parts of ethyl acetate, 5 parts of methyl acetate, 10 parts of toluene and 10 parts of benzyl alcohol. The composition obtained is suitable for removing lacquers prepared from drying oils or synthetic resins. When applied to coatings from such lacquers, the loosening action of the composition is very efficient because of the presence of 3-chlor-tetrahydrofurane which retards evaporation. Its loosening capacity, therefore, is relatively higher for example than that of methylene chloride. Part of the 3-chlor-tetrahydrofurane may be replaced by methylene chloride to shorten the time of drying.

What we claim is:

1. Solutions of a water-insoluble non-volatile organic film-forming material containing 3-chloro-tetrahydrofurane as a solvent.

2. A solution of a water-insoluble polyvinyl resin containing 3-chloro-tetrahydrofurane as a solvent.

3. A solution of a polyvinyl chloride containing 3-chloro-tetrahydrofurane as a solvent.

ALFRED RIECHE.
ALFRED GNUECHTEL.